United States Patent
Naidu et al.

(10) Patent No.: US 11,480,117 B2
(45) Date of Patent: Oct. 25, 2022

(54) METHOD AND SYSTEM FOR VEHICLE STOP/START CONTROL

(71) Applicant: Ford Global Technologies, LLC, Dearborn, MI (US)

(72) Inventors: Ashish Naidu, Canton, MI (US); David Ostrowski, Northville, MI (US); Victoria Schein, Dearborn, MI (US); William Herbert, Bloomfield Hills, MI (US); Mohan John, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 16/222,653

(22) Filed: Dec. 17, 2018

(65) Prior Publication Data

US 2020/0191069 A1    Jun. 18, 2020

(51) Int. Cl.
*F02D 29/02*    (2006.01)

(52) U.S. Cl.
CPC .......... *F02D 29/02* (2013.01); *F02D 2200/60* (2013.01); *F02D 2200/70* (2013.01)

(58) Field of Classification Search
CPC .. F02D 29/02; F02D 2200/70; F02D 2200/60; F02D 2041/1412; F02D 41/2451; F02D 2200/701; Y02T 10/60; B60W 10/06; B60W 50/0098; B60W 2050/0043; B60W 2710/06
See application file for complete search history.

(56) References Cited

U.S. PATENT DOCUMENTS

| | | | |
|---|---|---|---|
| 6,161,071 A * | 12/2000 | Shuman | B60K 28/06 340/436 |
| 6,735,515 B2 | 5/2004 | Bechtolsheim et al. | |
| 9,256,576 B2 | 2/2016 | Gibson et al. | |
| 9,371,766 B2 * | 6/2016 | Wang | F02D 41/029 |
| 9,457,793 B2 | 10/2016 | Uno | |
| 10,392,002 B2 * | 8/2019 | Leone | B60W 30/18018 |
| 10,487,762 B2 * | 11/2019 | Vadlamani | B60W 30/18136 |
| 10,508,591 B2 * | 12/2019 | Upadhyay | F02M 26/06 |
| 10,668,929 B2 * | 6/2020 | Tochioka | B60W 30/025 |
| 10,704,520 B2 * | 7/2020 | Lee | G01S 19/42 |
| 2013/0024060 A1 * | 1/2013 | Sukkarie | G01C 21/26 701/22 |
| 2014/0088858 A1 | 3/2014 | Stefan et al. | |
| 2017/0130635 A1 * | 5/2017 | Smith | F01N 11/002 |
| 2018/0093650 A1 | 4/2018 | Payne et al. | |
| 2018/0118189 A1 | 5/2018 | Payne | |
| 2018/0120119 A1 | 5/2018 | Payne | |

(Continued)

FOREIGN PATENT DOCUMENTS

| WO | 2015178838 A1 | 11/2015 |
|---|---|---|
| WO | 2017085527 A1 | 5/2017 |

(Continued)

*Primary Examiner* — David Hamaoui
(74) *Attorney, Agent, or Firm* — Vincent Mastrogiacomo; McCoy Russell LLP

(57) ABSTRACT

Methods and systems are presented for improving performance of a vehicle operating in a cruise control mode where a controller adjusts torque output from a vehicle to maintain vehicle speed within a desired range. The methods and systems include adapting a vehicle dynamics model and a vehicle fuel consumption map that provide input to nonlinear model predictive controller.

20 Claims, 9 Drawing Sheets

(56) References Cited

U.S. PATENT DOCUMENTS

2019/0001981 A1\* 1/2019 Thunga Gopal ...... B60W 20/15
2019/0351908 A1\* 11/2019 Marsden ........... B60W 50/0097
2020/0307384 A1\* 10/2020 Mendez Pineda ...... B60L 58/10

FOREIGN PATENT DOCUMENTS

WO 2018102428 A1 6/2018
WO 2018102828 A1 6/2018

\* cited by examiner

METHOD AND SYSTEM FOR VEHICLE STOP/START CONTROL

FIELD

The present description relates generally to methods and systems for controlling automatic stopping of an internal combustion engine.

BACKGROUND/SUMMARY

A vehicle may include an engine that is automatically stopped (e.g., not rotating and not combusting fuel) during conditions where driver demand torque or power is low. By stopping the engine, fuel consumption and engine emissions may be reduced. The engine may be stopped while the vehicle is stopped at a traffic light or while the vehicle is waiting for passengers to arrive. However, to further reduce fuel consumption and engine emissions, it may be desirable to stop the engine while the vehicle is coasting (e.g., moving on a road while the vehicle's engine is not delivering positive torque to accelerate the vehicle or maintain vehicle speed). Nevertheless, if the engine is restarted just after it has been stopped due to a change in driver demand torque or power, it may not have been beneficial to stop the engine since fuel consumption and engine emissions may increase if the engine is stopped for a short period of time. In addition, stopping and restarting the engine may aggravate vehicle occupants since they may notice noise and vibration that may be caused during engine stopping and starting. Therefore, it may be desirable to provide a way of determining when stopping the engine may be advantageous and acceptable to vehicle occupants.

The inventors herein have recognized the above-mentioned issue and have developed an engine operating method, comprising: adjusting an estimated vehicle coasting duration via a controller based on responses of a peer group of human drivers; and automatically stopping an internal combustion engine via the controller responsive to the estimated vehicle coasting duration.

By adjusting an estimated vehicle coasting duration based on responses to a peer group of drivers, it may be possible to stop the engine so as to extend the amount of time the engine is off, thereby reducing engine emissions and fuel consumption. Further, the responses of the peer group of drivers may be indicative that stopping of the engine may be expected and tolerated during present driving conditions. For example, data from a large peer group of drivers may indicate that peer drivers of similar vehicles tend to coast and then stop for a duration of at least two minutes while driving on a particular road segment. Therefore, it may be expected that the vehicle presently being driven may coast and then stop over a time duration of two minutes for similar driving conditions. If it is determined that automatic engine stopping is beneficial and not likely to aggravate vehicle occupants during conditions where the vehicle coasts and stops for more than one and a half seconds, then the engine may be automatically stopped at a point in the travel route that is expected to provide the two seconds where the engine is stopped (e.g., not rotating and not combusting fuel).

The present description may provide several advantages. In particular, the approach may reduce fuel consumption and aggravation of vehicle occupants. Additionally, the approach may decrease vehicle emissions and improve repeatability of engine stopping conditions. Further, the approach may also include additional options to improve the estimated amount of time a vehicle will coast before stopping so that fuel consumption and vehicle drivability may be further improved.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
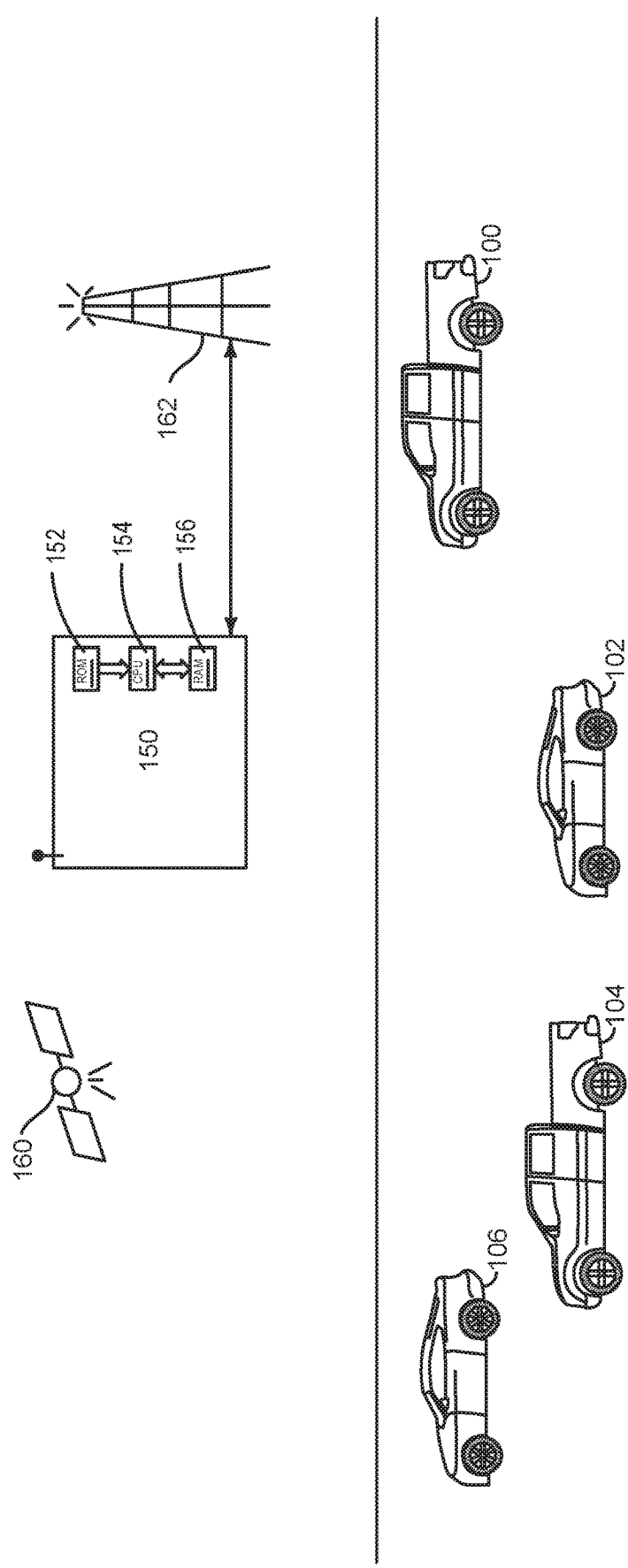
FIG. 1A shows an example peer group of vehicles that may be included in the systems and methods described herein.
Figure 1B:
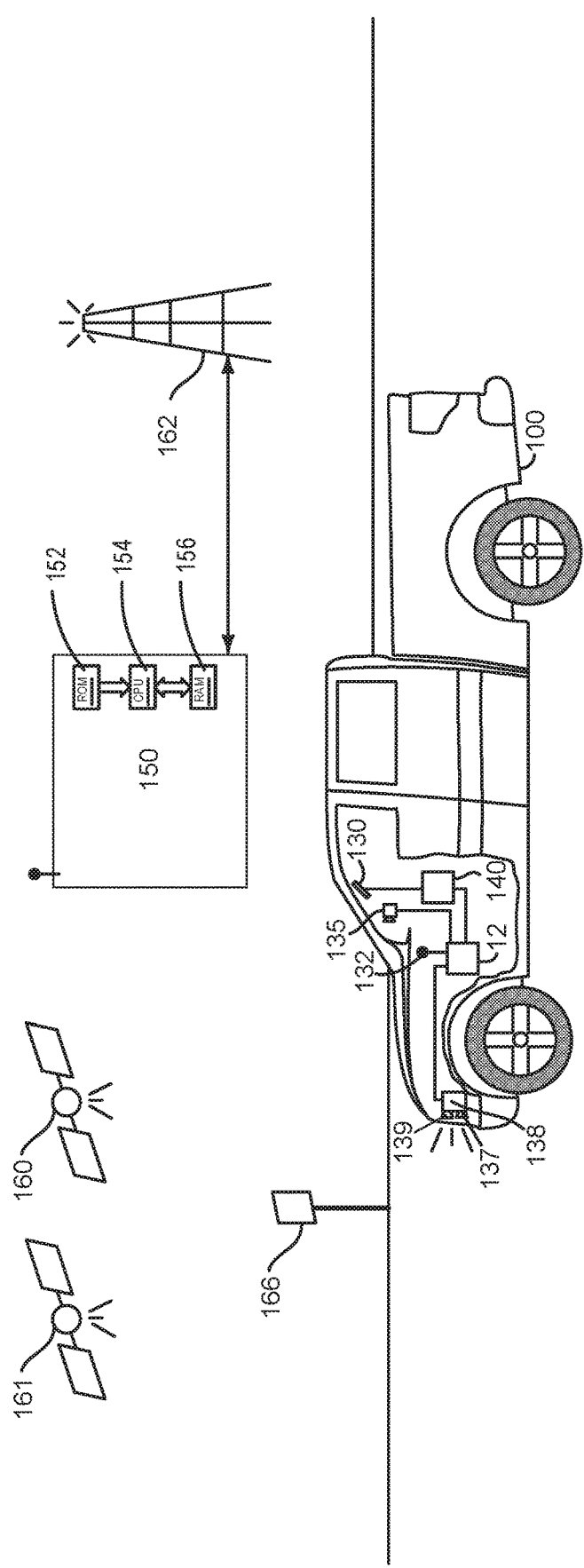
FIG. 1B shows an example vehicle including its distance to object sensing system.
Figure 2:
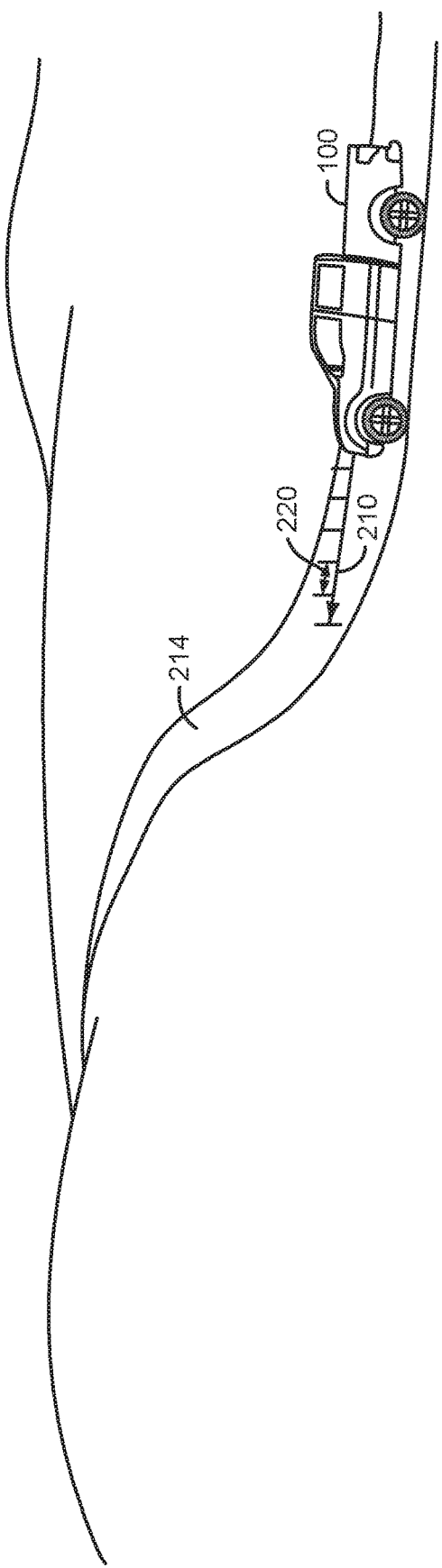
FIG. 2 shows an example vehicle and its electronic horizon.
Figure 3:
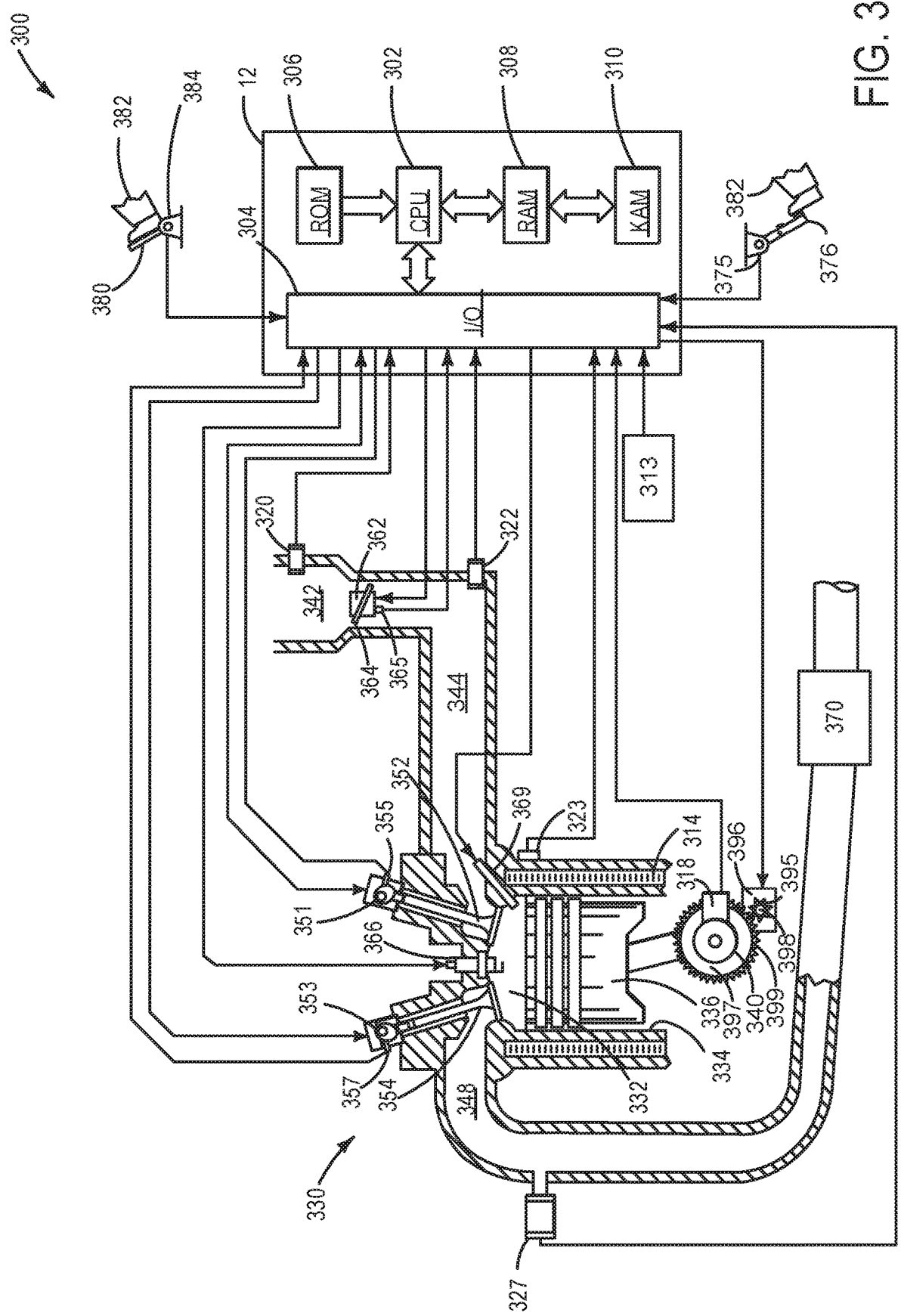
FIG. 3 shows an example vehicle motive power source.
Figure 4:
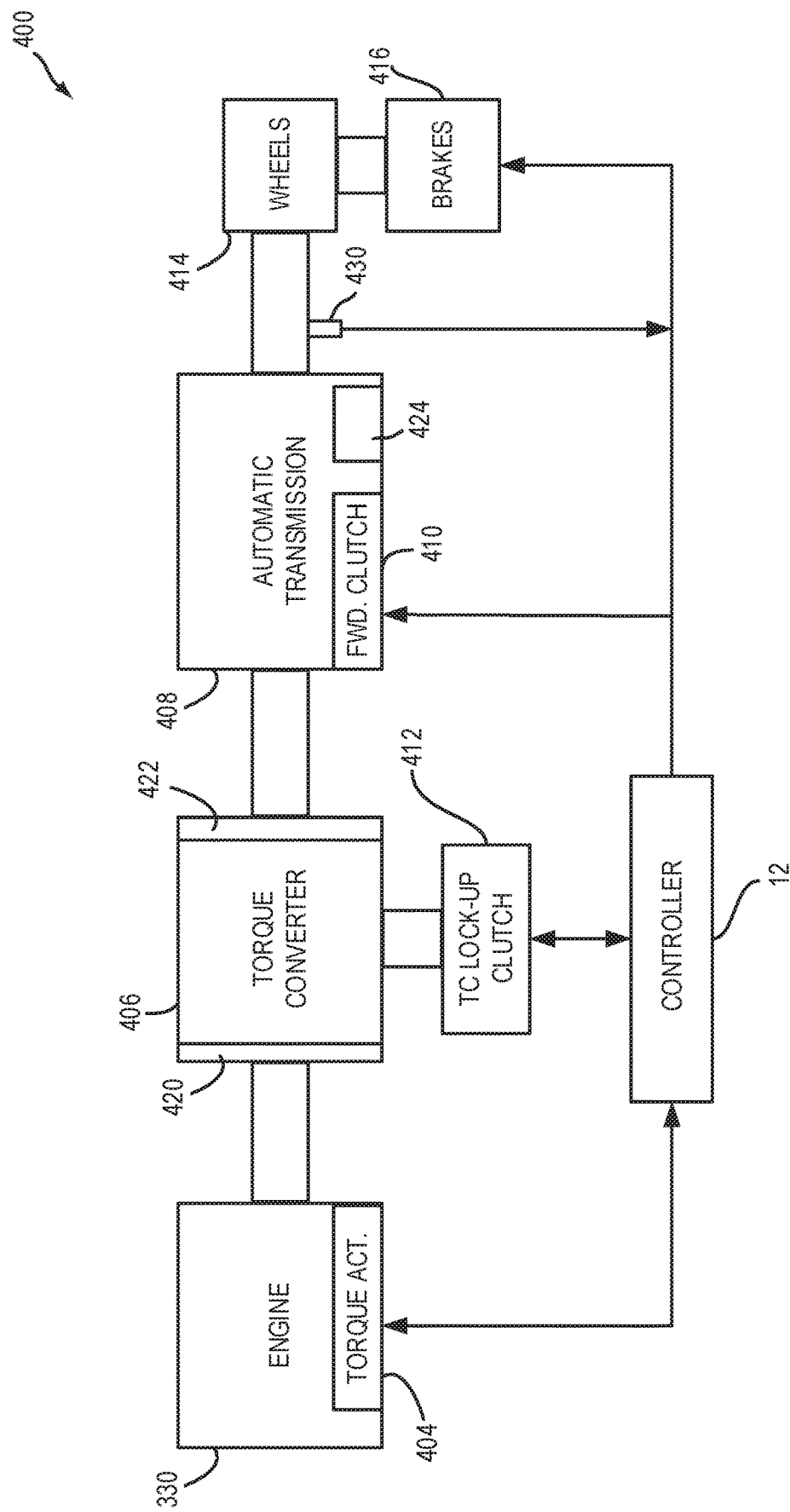
FIG. 4 shows an example vehicle driveline including the vehicle motive power source.
Figure 5:
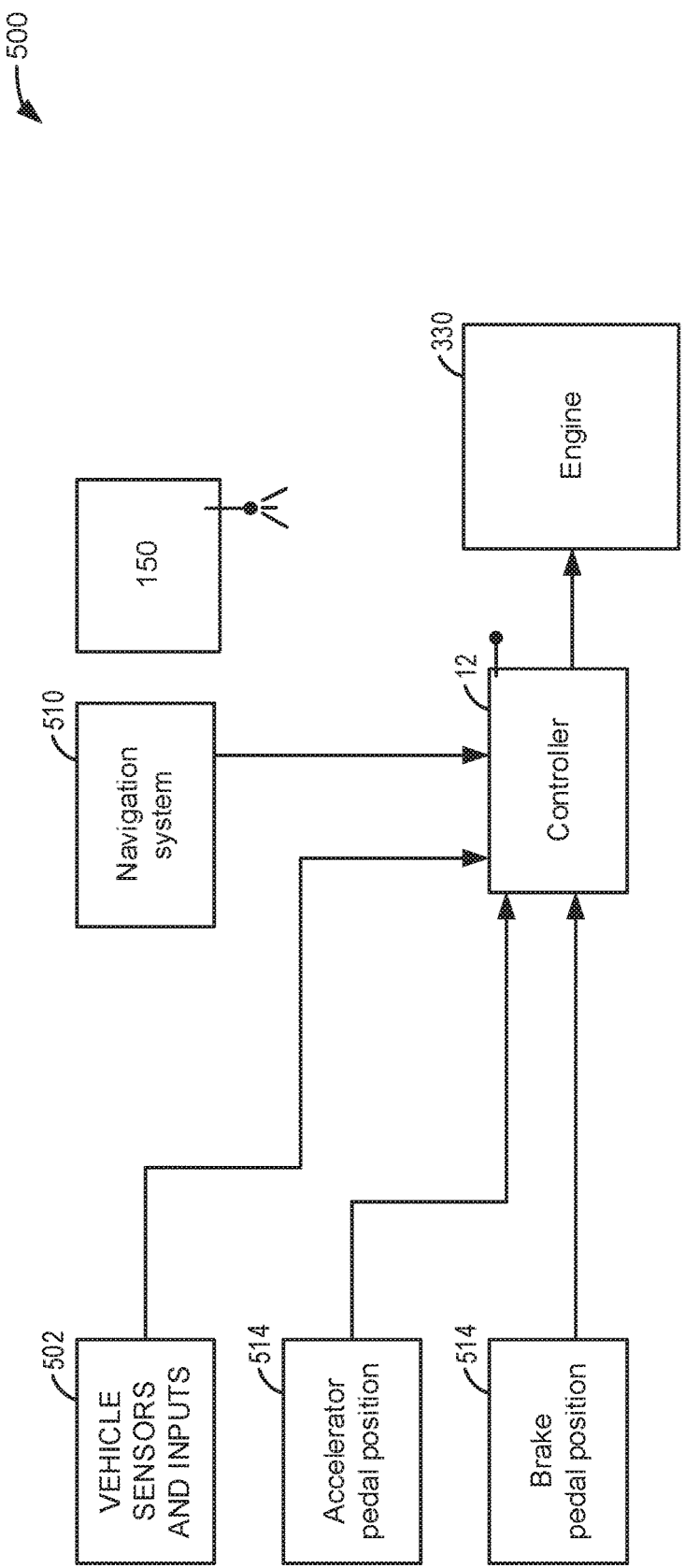
FIG. 5 shows a block diagram of an example automatic engine stopping and starting system.
Figure 6:
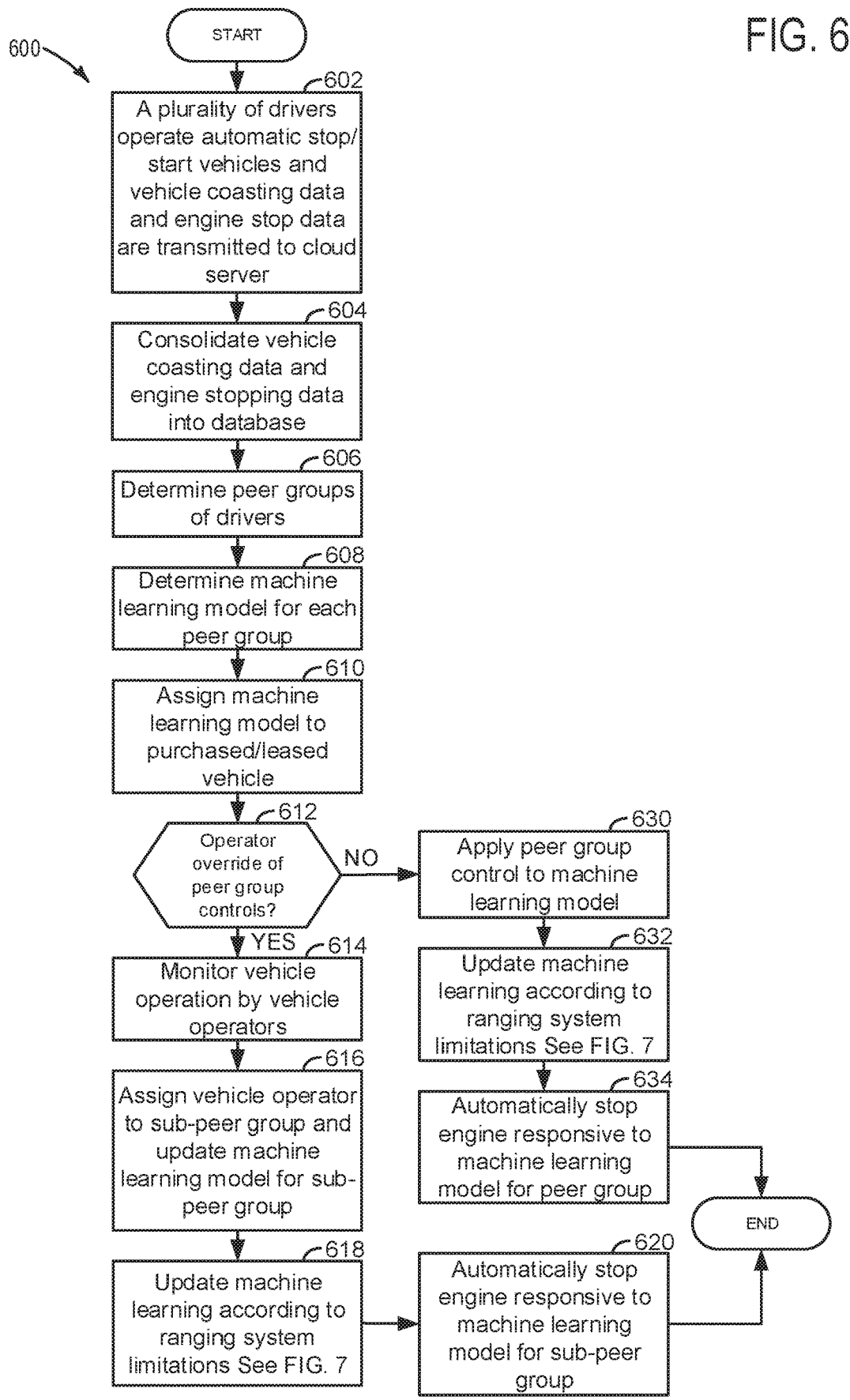
FIGS. 6 and 7 show an example method for automatically stopping an engine based on data of peer group vehicles and operating conditions of a distance to object sensing system.
Figure 7:
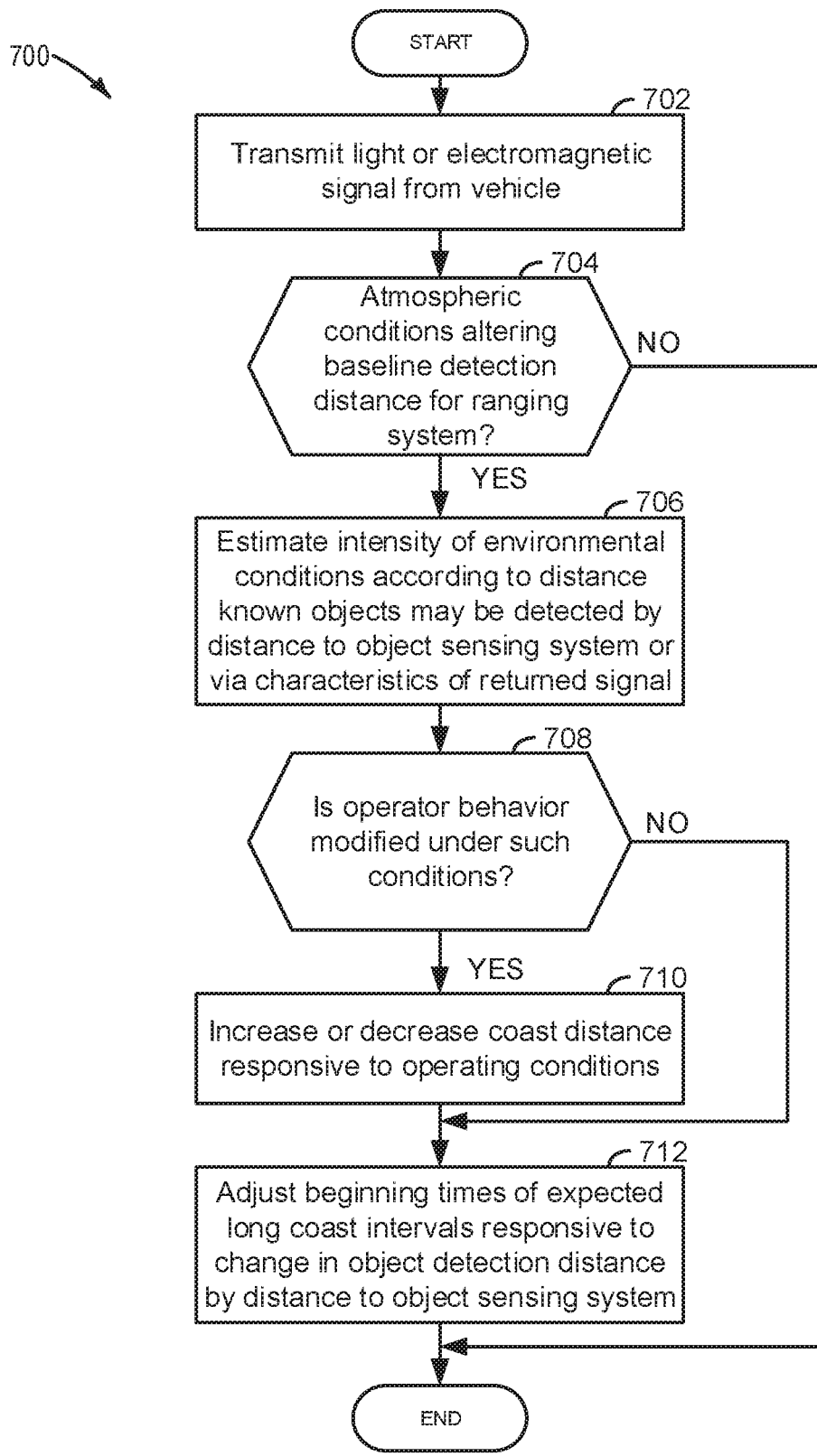
Figure 8:
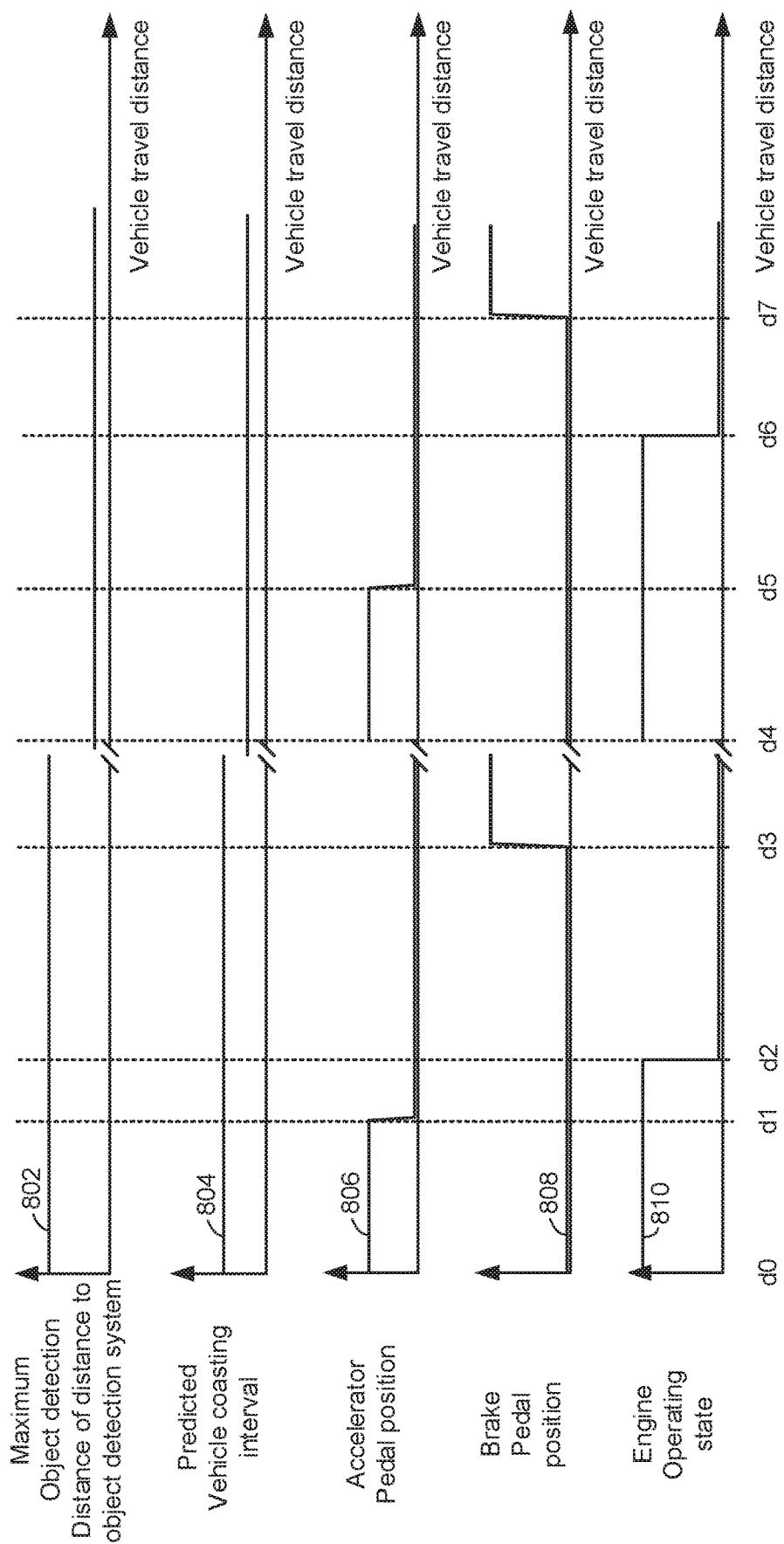
FIG. 8 shows an example of automatic engine stopping according to the method of FIGS. 6 and 7.

The following description relates to systems and methods for improving operation of automatic engine stopping and starting. FIG. 1A shows a group of peer vehicles that include automatic engine stopping and starting. The peer group may be a basis for estimating a vehicle coasting duration for other vehicles. FIG. 1B shows a vehicle that includes an engine that may be automatically stopped and started to conserve fuel and reduce emissions based on data from the peer group of vehicles shown in FIG. 1A. FIG. 2 shows the vehicle from FIG. 1B and its electronic horizon. The electronic horizon provides input to a machine learning model to estimate vehicle coasting duration. FIGS. 3 and 4 show example driveline components for the vehicle shown in FIG. 1B. FIG. 5 is a block diagram of an example vehicle control system that estimates vehicle coasting duration. Methods for operating a vehicle and automatically stopping an engine to conserve fuel and reduce emissions are shown in FIGS. 6 and 7. Example automatic engine stopping sequences are shown in FIG. 8.

Referring now to FIG. 1A, a peer group of vehicles and a data depository system for estimating vehicle coasting duration (e.g., an amount of time) is shown. Vehicles 100-106 are a peer group of vehicles that provide data to data depository system 150, which may be referred to as a remote server 150. Remote server 150 may include a processor 154, random access memory 152, and non-transitory memory 156 for storing data and evaluating data from vehicles

100-106. Remote server 150 may also send each of vehicles 100-106 an individual and unique machine learning model to estimate vehicle coasting times that is based on data that has been received from vehicles 100-106 and other vehicle that are not shown. Server 150 may receive vehicle data from vehicles 100-106 via satellite 160 or via radio frequency towers 162 (e.g., cellular network towers). Server 150 may also send data to vehicles 100-106 that includes but is not limited to machine learning models. Data may be sent to vehicles 100-106 via satellite 160 and radio frequency towers 162.

Vehicles 100-106 in the peer group may all be configured with an engine that may be automatically stopped and started in response to vehicle conditions. The engine of each vehicle may be automatically stopped and started without the vehicle's human occupants providing input to a device that has a sole function of starting and stopping the engine (e.g., a pushbutton or key switch). Each vehicle may be automatically stopped (e.g., not rotating and not combusting fuel) and started via controllers included in the respective vehicles responsive to vehicle operating conditions (e.g., vehicle speed, driver demand torque or power, etc.).

Server 150 may organize vehicles 100-106 into a peer group that is based on vehicle operating conditions such as, but not limited to driver age, driver's geographic home area, geographic location of the vehicle, vehicle options (e.g., type of drivetrain, two wheel drive, four wheel drive, off-road suspension, magnetically controlled suspension, etc.), electronic horizon capabilities, vehicle navigation system configuration, and driver behavior.

Referring now to FIG. 1B, vehicle 100, also shown in FIG. 1A, includes a controller 12 for receiving sensor data and adjusting actuators. Controller 12 may operate vehicle 100 responsive to vehicle operating conditions including driver demand torque, vehicle speed, ambient temperature, engine temperature, and engine speed. Controller 12 may also automatically stop and start the engine shown in FIG. 3, which is included in vehicle 100. In some examples, controller 12 may cooperate with additional controllers to operate vehicle 100. The controller 12 receives signals from the various sensors shown in FIGS. 1A-5. Controller 12 employs the actuators shown in FIGS. 1A-5 to adjust engine operation based on the received signals and instructions stored in memory of controller 12.

Vehicle 100 is shown with global positioning system (GPS) receiver 130. Satellite 161 provides time stamped information (e.g., data) to GPS receiver 130 which relays the information to vehicle position determining system 140. Vehicle positioning determination system 140 relays present and future road grade data to controller 12. Vehicle 100 may also be equipped with optional camera 135 for surveying road conditions in the path of vehicle 135. For example, camera 135 may acquire road conditions from road side signs 166 or displays. Controller 12 may receive data from remote server 150 via receiver 132, which may be configured to receive data from satellite 160 and/or broadcast tower 162. In some examples, vehicle 100 may also include a distance to object sensing system 138 that includes a transmitter 139 for sending signals and a receiver 137 for receiving signals (e.g., reflected signals generated via transmitter 139) that indicate positions of objects in the driving for determining the proximity of vehicles in the travel path of vehicle 100. Alternatively, transmitter 139 and receiver 137 may be replaced by a transceiver. Distance to object sensing system 138 may be laser (e.g., LIDAR), sound, or RADAR signal based. Distance to object sensing system 138 may determine a distance between vehicle 100 and objects (e.g., signs, traffic signals, animate objects, structures, etc.) in the vehicle's path including objects within an electronic horizon as shown in FIG. 2.

Referring now to FIG. 2, an example vehicle 100 and a distance 210 corresponding to the vehicle's electronic horizon is shown. Vehicle 100 generates an electronic horizon (e.g., a data vector) comprised of road grade information for road 214, distance to objects along the vehicle's path, known objects along the vehicle's path (e.g., bridges, signs, rest areas, etc.), speed limits, traffic signs, traffic lights, number of road lanes, and road class. The electronic horizon is made up of a plurality of blocks 220 or segments, and the blocks have a single associated or corresponding road grade or slope. Each block may also include data regarding distance to objects along the vehicle's path, known objects along the vehicle's path, speed limits, traffic signs, traffic lights, number of road lanes, road class, etc. The block's length may be based on distance or time, and the number of blocks in the electronic horizon may be adjusted according to capability of the distance to object sensing system to detect objects at a distance and available GPS information. The block information may be provided for a predetermined distance 210 or a predetermined amount of time in the vehicle's travel path and the electronic horizon may be comprised of a plurality of blocks 220. The block information may be provided to controller 12 shown in FIG. 1. For example, the block information may be provided for a predetermined distance in the path of vehicle 100, 20 meters for example; however, if the capability of the object sensing system is degraded due to environmental conditions, the block information may be reduced to 10 meters and the actual total number of blocks in the electronic horizon may be reduced. Alternatively, the block information may be provided for a predetermined amount of time into the future of the vehicle's travel path; however, if the capability of the object sensing system is degraded due to environmental conditions, the block duration may be reduced to a shorter time duration (e.g., from 20 seconds to 15 seconds) and the actual total number of blocks in the electronic horizon may be reduced.

Block data may be stored in memory of vehicle position determining system 140 shown in FIG. 1, with the exception of data provided by the distance to object sensing system. In one example, the block data including road grade values and other road attributes may be retrieved from memory by indexing the memory based on vehicle position and heading as determined from the vehicle position determining system 140. Road attributes such as road grade and object locations that occur over the predetermined distance or time may be stored as an array or vector in memory, and updates to the array may be provided as the vehicle moves in a first-in first-out basis. For example, if a road grade value is provided for every 100 meters of road surface, an array corresponding to 1500 meters of road grade data includes 15 blocks and their corresponding road grade values. The road grade values and object locations may change step-wise between blocks.

Referring now to FIG. 3, an example vehicle motive power source is shown. In this example, the vehicle motive power source is a spark ignition engine. However, the vehicle motive power source may be a diesel engine, a turbine, or an electric machine.

FIG. 3 is schematic diagram showing one cylinder of a multi-cylinder engine 330 in an engine system 300 is shown. Engine 330 may be controlled at least partially by a control system including a controller 12 and by input from a human vehicle operator 382 via an input device 380. In this example, the input device 380 includes an accelerator pedal and a pedal position sensor 384 for generating a proportional pedal position signal. Similarly, controller 12 may receive input from brake pedal position sensor 375 to determine a position of brake pedal 376. Human driver 382 may selectively apply brake pedal 376.

A combustion chamber 332 of the engine 330 may include a cylinder formed by cylinder walls 334 with a piston 336 positioned therein. The piston 336 may be coupled to a crankshaft 340 so that reciprocating motion of the piston is translated into rotational motion of the crankshaft. The crankshaft 340 may be coupled to at least one drive wheel of a vehicle via an intermediate transmission system as shown in FIG. 4. Flywheel 397 and ring gear 399 are coupled to crankshaft 340. Optional starter 396 (e.g., low voltage (operated with less than 30 volts) electric machine) includes pinion shaft 398 and pinion gear 395. Pinion shaft 398 may selectively advance pinion gear 395 to engage ring gear 399. Starter 396 may be directly mounted to the front of the engine or the rear of the engine. In some examples, starter 396 may selectively supply torque to crankshaft 340 via a belt or chain. In one example, starter 396 is in a base state when not engaged to the engine crankshaft. Starter 396 may selectively rotate crankshaft 340 to move piston 336.

Combustion chamber 332 may receive intake air from an intake manifold 344 via an intake passage 342 and may exhaust combustion gases via an exhaust passage 348. The intake manifold 344 and the exhaust passage 348 can selectively communicate with the combustion chamber 332 via respective intake valve 352 and exhaust valve 354. In some examples, the combustion chamber 332 may include two or more intake valves and/or two or more exhaust valves.

In this example, the intake valve 352 and exhaust valve 354 may be controlled by cam actuation via respective cam actuation systems 351 and 353. The cam actuation systems 351 and 353 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 352 and exhaust valve 354 may be determined by position sensors 355 and 357, respectively. In alternative examples, the intake valve 352 and/or exhaust valve 354 may be controlled by electric valve actuation. For example, the cylinder 332 may alternatively include an intake valve controlled via electric valve actuation and an exhaust valve controlled via cam actuation including CPS and/or VCT systems.

A fuel injector 369 is shown coupled directly to combustion chamber 332 for injecting fuel directly therein in proportion to the pulse width of a signal received from the controller 12. In this manner, the fuel injector 369 provides what is known as direct injection of fuel into the combustion chamber 332. The fuel injector may be mounted in the side of the combustion chamber or in the top of the combustion chamber, for example. Fuel may be delivered to the fuel injector 369 by a fuel system (not shown) including a fuel tank, a fuel pump, and a fuel rail. In some examples, the combustion chamber 332 may alternatively or additionally include a fuel injector arranged in the intake manifold 344 in a configuration that provides what is known as port injection of fuel into the intake port upstream of the combustion chamber 332.

Spark is provided to combustion chamber 332 via spark plug 366. The ignition system may further comprise an ignition coil (not shown) for increasing voltage supplied to spark plug 366. In other examples, such as a diesel, spark plug 366 may be omitted.

The intake passage 342 may include a throttle 362 having a throttle plate 364. In this particular example, the position of throttle plate 364 may be varied by the controller 12 via a signal provided to an electric motor or actuator included with the throttle 362, a configuration that is commonly referred to as electronic throttle control (ETC). In this manner, the throttle 362 may be operated to vary the intake air provided to the combustion chamber 332 among other engine cylinders. The position of the throttle plate 364 may be provided to the controller 12 by a throttle position signal. The intake passage 342 may include a mass air flow sensor 320 and a manifold air pressure sensor 322 for sensing an amount of air entering engine 330.

An exhaust gas sensor 327 is shown coupled to the exhaust passage 348 upstream of an emission control device 370 according to a direction of exhaust flow. The sensor 327 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 327 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 370 is shown arranged along the exhaust passage 348 downstream of the exhaust gas sensor 327. The device 370 may be a three way catalyst (TWC), $NO_x$ trap, various other emission control devices, or combinations thereof. In some examples, during operation of the engine 330, the emission control device 370 may be periodically reset by operating at least one cylinder of the engine within a particular air-fuel ratio.

The controller 12 is shown in FIG. 3 as a microcomputer, including a microprocessor unit 302, input/output ports 304, an electronic storage medium for executable programs and calibration values shown as read only memory chip 306 (e.g., non-transitory memory) in this particular example, random access memory 308, keep alive memory 310, and a data bus. The controller 12 may receive various signals from sensors coupled to the engine 330, in addition to those signals previously discussed, including measurement of inducted mass air flow (MAF) from the mass air flow sensor 320; engine coolant temperature (ECT) from a temperature sensor 323 coupled to a cooling sleeve 314; an engine position signal from a Hall effect sensor 318 (or other type) sensing a position of crankshaft 340; throttle position from a throttle position sensor 365; and manifold absolute pressure (MAP) signal from the sensor 322. An engine speed signal may be generated by the controller 12 from crankshaft position sensor 318. Manifold pressure signal also provides an indication of vacuum, or pressure, in the intake manifold 344. Note that various combinations of the above sensors may be used, such as a MAF sensor without a MAP sensor, or vice versa. During engine operation, engine torque may be inferred from the output of MAP sensor 322 and engine speed. Further, this sensor, along with the detected engine speed, may be a basis for estimating charge (including air) inducted into the cylinder. In one example, the crankshaft position sensor 318, which is also used as an engine speed sensor, may produce a predetermined number of equally spaced pulses every revolution of the crankshaft.

Controller 12 may receive user input via human/machine interface 313. Controller 12 may also output data to a human via human/machine interface 313. Human/machine interface 313 may take the form of a display panel and keyboard or touch screen. Alternatively, human/machine interface 313 may take the form of push buttons and/or selector switches or other known human/machine interfaces.

The storage medium read-only memory 306 can be programmed with computer readable data representing non-transitory instructions executable by the processor 302 for performing at least portions of the methods described below as well as other variants that are anticipated but not specifically listed.

During operation, each cylinder within engine 330 typically undergoes a four stroke cycle: the cycle includes the intake stroke, compression stroke, expansion stroke, and exhaust stroke. During the intake stroke, generally, the exhaust valve 354 closes and intake valve 352 opens. Air is introduced into combustion chamber 332 via intake manifold 344, and piston 336 moves to the bottom of the cylinder so as to increase the volume within combustion chamber 332. The position at which piston 336 is near the bottom of the cylinder and at the end of its stroke (e.g. when combustion chamber 332 is at its largest volume) is typically referred to by those of skill in the art as bottom dead center (BDC).

During the compression stroke, intake valve 352 and exhaust valve 354 are closed. Piston 336 moves toward the cylinder head so as to compress the air within combustion chamber 332. The point at which piston 336 is at the end of its stroke and closest to the cylinder head (e.g. when combustion chamber 332 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 366, resulting in combustion.

During the expansion stroke, the expanding gases push piston 336 back to BDC. Crankshaft 340 converts piston movement into a rotational torque of the rotary shaft. Finally, during the exhaust stroke, the exhaust valve 354 opens to release the combusted air-fuel mixture to exhaust manifold 348 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 3 shows only one cylinder of a multi-cylinder engine, and each cylinder may similarly include its own set of intake/exhaust valves, fuel injector, spark plug, etc.

Referring now to FIG. 4, a schematic of a vehicle drivetrain 400 is shown. Drivetrain 400 may be powered by engine 330 as shown in greater detail in FIG. 3. In one example, engine 330 may be a gasoline engine. In alternate examples, other engine configurations may be employed, for example, a diesel engine. Engine 330 may be started with an engine starting system (not shown). Further, engine 330 may generate or adjust torque via torque actuator 404, such as a fuel injector, throttle, cam, etc.

An engine output torque may be transmitted to torque converter 406 to drive a step-ratio automatic transmission 408 by engaging one or more clutches, including forward clutch 410, where the torque converter may be referred to as a component of the transmission. Torque converter 406 includes an impeller 420 that transmits torque to turbine 422 via hydraulic fluid. One or more gear clutches 424 may be engaged to change gear ratios between engine 330 and vehicle wheels 414. The output of the torque converter 406 may in turn be controlled by torque converter lock-up clutch 412. As such, when torque converter lock-up clutch 412 is fully disengaged, torque converter 406 transmits torque to automatic transmission 408 via fluid transfer between the torque converter turbine 422 and torque converter impeller 420, thereby enabling torque multiplication. In contrast, when torque converter lock-up clutch 412 is fully engaged, the engine output torque is directly transferred via the torque converter clutch 412 to an input shaft of transmission 408. Alternatively, the torque converter lock-up clutch 412 may be partially engaged, thereby enabling the amount of torque relayed to the transmission to be adjusted. A controller 12 may be configured to adjust the amount of torque transmitted by the torque converter by adjusting the torque converter lock-up clutch in response to various engine operating conditions, or based on a driver-based engine operation request.

Torque output from the automatic transmission 408 may in turn be relayed to wheels 414 to propel the vehicle. Specifically, automatic transmission 408 may adjust an input driving torque at the input shaft (not shown) responsive to a vehicle traveling condition before transmitting an output driving torque to the wheels. Vehicle speed may be determined via speed sensor 430.

Further, wheels 414 may be locked by engaging wheel brakes 416. In one example, wheel brakes 416 may be engaged in response to the driver pressing his/her foot on a brake pedal (shown in FIG. 3). In the similar way, wheels 414 may be unlocked by disengaging wheel brakes 416 in response to the driver releasing his foot from the brake pedal.

Referring now to FIG. 5, a block diagram of an example vehicle system for automatically stopping and starting an engine is shown. Automatic engine stopping and starting system 500 includes vehicle sensors as shown at block 502. Vehicle sensors may include but are not limited to sensors for determining a distance from the vehicle to an object in or along the vehicle's path (e.g., LIDAR, RADAR, etc.), vehicle to vehicle communications sensors/transmitters, and vehicle to infrastructure communications sensors/transmitters. Further, the sensors may include sensors for the vehicle motive power source torque, speed, energy consumption or fuel consumption, and ambient environmental operating conditions. Controller 12 may also receive accelerator pedal and brake pedal input. Navigation (e.g., GPS) system may also provide the vehicle's present position, road conditions, geographical conditions (e.g., whether forecast, barometric pressure, etc.), and road attributes (e.g., locations of known objects in the vehicle's path, path of the road, etc.) to controller 12. Controller 12 may generate an electronic horizon for the vehicle from the data that is received from the navigation system and the vehicle sensors. Alternatively, the vehicle sensor information and navigational information may be provided to a separate vehicle system controller (not shown) or an electronic horizon generator that requests engine starting and stopping via controller 12 based on what is included in the electronic horizon. In still another example, the electronic horizon may be generated via the vehicle position determining system 140 according to navigation and vehicle sensor information or data.

An electronic horizon may be comprised of an array of memory locations or a vector of data and the array may include a plurality of road conditions including road grade values that describe road grade of the road the vehicle is traveling. The electronic horizon may also include locations of known and unknown objects in or near the vehicle's path, distance to objects in or near the vehicle's path, geographical conditions, etc. In one example, the electronic horizon extracts road grade values and other road conditions and object locations from a database that describes road conditions (e.g., grade values stored in memory, the grade values extracted from a three dimensional map of the earth's surface). The road grade values and other road conditions may include road grade at the vehicle's present position as well as road grade values in front of the vehicle in the vehicle's path of travel. Locations of objects in the vehicle's path may also be included. The road grade may be converted to road angle. Controller 12 or another controller updates the electronic horizon array or vector of road grade values at selected times.

Controller 12 may also receive data from peer group vehicles and a machine learning model from server 150. The peer group information may include but is not limited to locations along the present vehicle's path where peer group vehicles enter vehicle coasting (e.g., where the driver demand power or torque is less than a threshold and/or where positive engine torque that is delivered to vehicle wheels is insufficient to maintain vehicle speed). Further, the peer group information may include locations along the present vehicle's path where peer group vehicles enter vehicle coasting before vehicle braking and stopping. The peer group information and electronic horizon information are input to the machine learning model and the machine learning model outputs locations along the vehicle's path where it is predicted or expected that the vehicle will enter coasting. An engine stop request may be made when the vehicle is expected to coast and when other select conditions are met (e.g., the accelerator pedal may have to be released for the engine stop request to be generated).

Thus, the system of FIGS. 1A-5 provides for an engine control system, comprising: an internal combustion engine; a distance to object sensing system that transmits a signal and receives a reflected version of the signal; and a controller including executable instructions stored in non-transitory memory to estimate a vehicle coasting duration and stop the internal combustion engine based on the vehicle coasting duration, the vehicle coasting duration estimated based on vehicle coasting durations of a predetermined peer group of human drivers, the vehicle coasting duration a function of responses of members of the predetermined peer groups during conditions where performance of the distance to object sensing system is degraded due to environmental conditions. The vehicle system includes where the environmental conditions include at least one of ambient air density, humidity, rain, dust, hail, snow, and insects. The vehicle system includes where the predetermined peer group of human drivers are human drivers of a specific vehicle make and model. The vehicle system includes where the predetermined peer group of human drivers are human drivers of a specific age group. The vehicle system includes where the predetermined peer group of human drivers in a specific geographical region. The vehicle system further comprises additional instructions to adjust a beginning time or location for the vehicle coasting duration responsive to a change in the distance to object sensing system's capacity to detect an object at a predetermined distance.

Referring now to FIGS. 6 and 7, an example method 600 for adaptively automatically stopping and starting an engine to conserve fuel and reduce emissions is shown. At least portions of method 600 may be included in a system as shown in FIGS. 1A-5 as executable instructions stored in non-transitory memory. The instructions may provide a control routine. Further, method 600 may include the method of FIG. 7 (e.g., method 700). Additionally, the method of FIGS. 6 and 7 may provide the operating sequence shown in FIG. 8. At least portions of method of 600 may be performed real-time in a vehicle driving on a road.

At 602, a plurality of drivers (e.g., human and/or automated) operate vehicles that include provisions for automatically stopping and starting an engine. The vehicles are operated on roads that have been mapped and data is gathered while the vehicles are being operated. In particular, responses of the drivers (e.g., application and release of brake pedals and accelerator pedals) are monitored while the vehicles are driven over the roads. Further, vehicle operating conditions are monitored to determine when the vehicle coasts, accelerates, stops, and starts while the vehicles are activated. Further still, conditions and places where the vehicle's engines are automatically stopped and started according to vehicle conditions are monitored. The monitored data is then uploaded to a remote server from the plurality of vehicles for behavioral analysis and processing. The data may be transmitted to the remote server (e.g., away from the vehicle) via a cellular network, satellite, or other known type of communication system. The remote server and processing may be referred to a "cloud" computing. Method 600 proceeds to 604.

At 604, method 600 consolidates the data, including vehicle coasting data and engine stopping data, into a database. The data includes the vehicle and driver attributes (e.g., vehicle type, vehicle model, vehicle options, driver age, driver's geographical area, and driver's gender) so that it may be organized for analysis. Method 600 proceeds to 606.

At 606, method 600 determines peer groups of drivers from the consolidated data. In one example, peer groups may be determined from driver demographics, vehicle options, and the geographic location of the driver. For example, one peer group of drivers may be male drivers of hybrid vehicles that are located in the southeast region of the United States of America. Another peer group of drivers may be female drivers of sports cars that are located in Canada. Peer groups may be defined by the vehicle manufacturer or they may be automatically generated via the remote server according to artifacts that are found in the data that is uploaded from the vehicles. For example, a peer group of drivers may be created for drivers of heavy duty trucks since data may indicate that they tend to coast the vehicle for longer durations than drivers of light duty trucks. In still another example, peer groups may be created and selected according to the type of driver (e.g., passive, aggressive, etc.). Method 600 proceeds to 608 after the peer groups are selected.

At 608, method 600 determines machine learning models for each of the peer groups. In one example, linear regression or other known techniques (e.g., neural network) may be applied to generate a machine learning model for each peer group from the data collected. The machine learning models describe relationships between the inputs (e.g., road grade, driver demand torque, vehicle type, driver type, vehicle type, vehicle options, etc.) of a particular peer group and outputs (e.g., an expected or predicted vehicle coasting starting location or a predicted starting time of vehicle coasting, predicted vehicle coasting duration (e.g., distance and/or time), vehicle stop location, expected or predicted engine stop location, expected or predicted amount of time the engine is stopped, expected engine starting time, etc.) of the particular peer group. The models may be expressed by mathematical representations. Method 600 proceeds to 610.

At 610, method 600 assigns a machine learning model to each purchased or leased vehicle. The machine learning models may be stored in vehicle controller memory (e.g., 306 of FIG. 3), and the particular machine learning model that is assigned to a particular vehicle may be a function of the vehicle's model, vehicle's options, vehicle's geographical location, type of driver, and attributes of the vehicle driver. The machine learning model may be selected with input and information provided by the vehicle's driver. Method 600 proceeds to 612.

In this way, data that has been consolidated in a remote server may be the basis for selecting a machine learning model that determines if vehicle coasting over a road segment may be predicted or expected. Further, the machine learning model may estimate the duration of vehicle coasting and an amount of time an engine is stopped based on conditions that the vehicle encounters along its travel path.

At 612, method 600 judges if a vehicle operator (e.g., human driver) has requested an override of controlling the vehicle via the machine learning model selected for the vehicle and the peer data. The vehicle operator may request an override of the machine learning model operating based on the peer data via a human/machine interface. If method 600 judges that a request has been made to override the machine learning model applying peer group data or information, the answer is yes and method 600 proceeds to 614. Otherwise, the answer is no and method 600 proceeds to 630.

At 630, method 600 applies peer group controls to the machine learning model selected for the particular vehicle. In one example, applying the peer group controls to the particular machine learning model causes the particular machine learning model to determine an expected or predicted outputs including, but not limited to, starting location for vehicle coasting or a predicted starting time for vehicle coasting, predicted vehicle coasting duration, expected or predicted vehicle stop location, expected or predicted engine stop location, expected or predicted amount of time the engine is stopped, and expected engine starting time for the particular vehicle based on peer group data. The predicted outputs of the particular machine learning model may be determined from the present vehicle operating conditions that are input to the machine learning model (e.g., the electronic horizon conditions, navigational information, accelerator pedal position, vehicle speed, brake pedal position, etc.) and the peer group conditions that influenced the model outputs.

For example, if the vehicle is presently traveling down a section of road where other peer group members have traveled, the model may output a predicted or expected starting location for vehicle coasting or a predicted starting time for vehicle coasting, predicted vehicle coasting duration, expected or predicted vehicle stop location, expected or predicted engine stop location, expected or predicted amount of time the engine is stopped, and expected engine starting time for the present vehicle based on peer group data based on where these conditions occurred for the peer group. The predicted vehicle coasting starting location (e.g., the location where the vehicle is expected to start coasting on the section of road it is traveling on) may be a mean location from the peer group where vehicle coasting started when the road was traveled by those in the peer group. For example, if there are three vehicles that provided the peer group data and the first vehicle in the peer group started coasting 10 meters after a location on the road the vehicle is traveling on changed from a positive grade to a negative grade, and the second vehicle in the peer group started coasting 8 meters after the location on the road the vehicle is traveling on changed from a positive grade to a negative grade, and the third vehicle in the peer group started coasting 15 meters after a location on the road the vehicle is traveling on changed from a positive grade to a negative grade, then the present vehicle may be expected to start coasting 11 meters after the location on the road the vehicle is traveling on changes from a positive grade to a negative grade (e.g., the average coasting location or distance from where the road grade changed from positive to negative). The predicted vehicle coasting duration, expected or predicted vehicle stop location, expected or predicted engine stop location, expected or predicted amount of time the engine is stopped, and expected engine starting time for the particular vehicle may be estimated in a similar way (i.e., from averages of the same conditions of the peer group). Method 600 proceeds to 632 after the predicted or expected machine learning model outputs are determined from the vehicle operating conditions.

At 632, method 600 revises or updates the predicted or expected outputs of the machine learning model responsive to the distance to object sensing system 138. The distance to object sensing system 138 may provide controller 12 with data that indicates a distance between the vehicle and an object that is sensed by the distance to object sensing system. However, during some conditions, rain, dust, insects, atmospheric pressure, temperature inversions, the usable range (e.g., the distance that the distance to object sensing system may reliably detect an object) may be reduced. Consequently, the amount of data for making a decision that vehicle coasting is expected or predicted may be reduced. During such conditions, method 700 shown in FIG. 7 may modify outputs of the machine learning model to improve the decision as to whether or not the vehicle is predicted or expected to enter a coasting condition. Then, method 600 proceeds to 634. If the capacity of the object sensing system to detect an object at a predetermined distance is not presently affected by environmental conditions, then method 600 proceeds to 634 where the engine may be automatically stopped.

At 634, method 600 automatically stops the engine responsive to output of the machine learning model and present vehicle conditions. Alternatively, method 600 automatically stops the engine responsive to the modified output of the machine learning model and present vehicle conditions. For example, if the vehicle's human driver has released the accelerator pedal and the vehicle is expected to begin coasting 11 meters after the location on the road the vehicle is traveling on changes from a positive grade to a negative grade and the engine is expected to be stopped 25 meters after the same location, then method 600 may request an automatic engine stop (e.g., cease engine rotation and combustion) 11 meters after the location on the road the vehicle is traveling on changes from a positive grade to a negative grade. This allows the engine to be shut off (e.g., cease rotating and combusting fuel) at the onset of the predicted or expected vehicle coasting so that the amount of time that the engine is stopped while the vehicle is coasting may be increased and/or maximized. Thus, the engine stop duration may be improved over the peer group to increase vehicle fuel efficiency. However, if the vehicle's human driver has not released the accelerator pedal and the vehicle is expected at the location that is 11 meters after the location on the road the vehicle is traveling on changes from a positive grade to a negative grade, then method 600 does not request an automatic engine stop until the human driver releases the accelerator pedal and the vehicle begins to coast near the location on the road the vehicle is traveling on changes from a positive grade to a negative grade. This allows the engine to respond to a higher driver torque demand so that the driver's intentions may be met. The request for engine stop may be made based on the predicted location where the vehicle will begin coasting, the predicted vehicle coasting duration, the predicted engine stop location, and the predicted amount of time the engine will be stopped.

If the machine learning model outputs have been modified according to limitations of the distance to object sensing system, then the request for automatic engine stopping may be adjusted accordingly. For example, if the vehicle's human driver has released the accelerator pedal and the vehicle is expected to begin coasting 11 meters after the location on the road the vehicle is traveling on changes from a positive grade to a negative grade and the engine is expected to be stopped 25 meters after the same location, but the distance to object sensing system is indicating that its ability to detect objects has been reduced to shorter distances, then method 600 may request an automatic engine stop 20 meters after the location on the road the vehicle is traveling on changes from a positive grade to a negative grade so that the distance to object system may have the opportunity to potentially detect objects in the vehicle's path so that the predicted engine stop duration may be appropriately adjusted. However, if the vehicle's human driver has not released the accelerator pedal and the vehicle is expected at the location that is 20 meters after the location on the road the vehicle is traveling on changes from a positive grade to a negative grade, then method 600 does not request an automatic engine stop until the human driver releases the accelerator pedal and the vehicle begins to coast near the location on the road the vehicle is traveling on changes from a positive grade to a negative grade. Method 600 may automatically restart the engine after the engine has been automatically stopped when automatic engine restart conditions have been met (e.g., the engine may be restarted when driver demand torque is greater than a threshold torque). Method 600 proceeds to exit.

At 614, method 600 monitors operation of the present vehicle by drivers or operators of the present vehicle. For example, method 600 monitors accelerator pedal and brake pedal positions along with conditions of the road the vehicle is driving on. By monitoring accelerator pedal and brake pedal conditions, the operator's behavior to selected driving conditions may be determined. Method 600 proceeds to 616.

At 616, method 600 assigns the present driver to a sub-peer group and updates the machine learning model with data from the present driver. In one example, the present driver may be characterized as an aggressive driver if the present driver frequently applies and releases the accelerator pedal or if the present driver drives above the posted speed limit. The present driver may be characterized as a passive driver if the present driver accelerates slowly and releases the accelerator pedal early so that the vehicle may coast farther. The present driver's assignment to a sub-peer group may cause changes to when the engine stop request is generated. For example, automatic engine stopping for aggressive drivers may be delayed beyond a beginning time or location for automatic engine stop for other members in the vehicle's peer group that are not members of the sub-peer group. Further, data of the present driver may be combined with data from the peer group so that output of the machine learning model is adjusted to accommodate driving practices of the present driver.

Including data from the present vehicle driver with data from the peer group of drivers as a basis for determining whether or not it may be desirable to automatically stop an engine may cause the particular machine learning model to determine revised predicted outputs including, but not limited to, the starting location for vehicle coasting or a predicted starting time for vehicle coasting, the predicted vehicle coasting duration, the expected or predicted vehicle stop location, the expected or predicted engine stop location, the expected or predicted amount of time the engine is stopped, and the expected engine starting time for the particular vehicle. Further, the predicted outputs of the particular machine learning model may also be determined in part from the present vehicle operating conditions that are input to the machine learning model (e.g., the electronic horizon conditions, navigational information, accelerator pedal position, vehicle speed, brake pedal position, etc.).

For example, if the vehicle is presently traveling down a section of road where other peer group members have traveled, the model may output a predicted or expected starting location for vehicle coasting or a predicted starting time for vehicle coasting, predicted vehicle coasting duration, expected or predicted vehicle stop location, expected or predicted engine stop location, expected or predicted amount of time the engine is stopped, and expected engine starting time for the present vehicle based on peer group data and data from the present vehicle driver based on where these conditions occurred for the peer group and the present vehicle driver at a past time. The predicted vehicle coasting starting location (e.g., the location where the vehicle is expected to start coasting on the section of road it is traveling on) may be a mean location from the peer group and the present driver where vehicle coasting started. For example, if there are three vehicles that provided the peer group data and the first vehicle in the peer group started coasting 10 meters after a location on the road the vehicle is traveling on changed from a positive grade to a negative grade, and the second vehicle in the peer group started coasting 8 meters after the location on the road the vehicle is traveling on changed from a positive grade to a negative grade, and the third vehicle in the peer group started coasting 15 meters after a location on the road the vehicle is traveling on changed from a positive grade to a negative grade, the present vehicle driver started coasting 11 meters after the location on the road the vehicle is traveling on changed from a positive grade to a negative grade, then the present vehicle may be expected to start coasting 10 meters after the location on the road the vehicle is traveling on changes from a positive grade to a negative grade. The predicted vehicle coasting duration, the expected or predicted vehicle stop location, the expected or predicted engine stop location, the expected or predicted amount of time the engine is stopped, and the expected engine starting time for the particular vehicle may be estimated in a similar way. Method 600 proceeds to 618 after the predicted or expected machine learning model outputs are determined from the vehicle operating conditions.

At 618, method 600 revises or updates the predicted or expected outputs of the machine learning model responsive to the distance to object sensing system 138. The distance to object sensing system 138 may provide controller 12 with data that indicates a distance between the vehicle and an object that is sensed by the distance to object sensing system. However, during some conditions, rain, dust, insects, atmospheric pressure, temperature inversions, the usable range (e.g., the distance that the distance to object sensing system may reliably detect an object) may be reduced. Consequently, the amount of data for making a decision that vehicle coasting is expected or predicted may be reduced. During such conditions, method 700 shown in FIG. 7 may modify outputs of the machine learning model to improve the decision as to whether or not the vehicle is predicted or expected to enter a coasting condition. Then, method 600 proceeds to 620. If the capacity of the object sensing system to detect an object at a predetermined distance is not presently affected by environmental conditions, then method 600 proceeds to 620 where the engine may be automatically stopped.

At 620, method 600 automatically stops the engine responsive to output of the machine learning model and present vehicle conditions. Alternatively, method 600 automatically stops the engine responsive to the modified output of the machine learning model and present vehicle conditions. For example, if the vehicle's human driver has released the accelerator pedal and the vehicle is expected to begin coasting 11 meters after the location on the road the vehicle is traveling on changes from a positive grade to a negative grade and the engine is expected to be stopped 25 meters after the same location, then method 600 may request an automatic engine stop (e.g., cease engine rotation and combustion) 11 meters after the location on the road the vehicle is traveling on changes from a positive grade to a negative grade. This allows the engine to be shut off (e.g., cease rotating and combusting fuel) at the onset of the predicted or expected vehicle coasting so that the amount of time that the engine is stopped while the vehicle is coasting may be increased and/or maximized. Thus, the engine stop duration may be improved over the peer group to increase vehicle fuel efficiency. However, if the vehicle's human driver has not released the accelerator pedal and the vehicle is expected at the location that is 11 meters after the location on the road the vehicle is traveling on changes from a positive grade to a negative grade, then method 600 does not request an automatic engine stop until the human driver releases the accelerator pedal and the vehicle begins to coast near the location on the road the vehicle is traveling on changes from a positive grade to a negative grade. This allows the engine to respond to a higher driver torque demand so that the driver's intentions may be met. The request for engine stop may be made based on the predicted location where the vehicle will begin coasting, the predicted vehicle coasting duration, the predicted engine stop location, and the predicted amount of time the engine will be stopped.

If the machine learning model outputs have been modified according to limitations of the distance to object sensing system, then the request for automatic engine stopping may be adjusted accordingly. For example, if the vehicle's human driver has released the accelerator pedal and the vehicle is expected to begin coasting 11 meters after the location on the road the vehicle is traveling on changes from a positive grade to a negative grade and the engine is expected to be stopped 25 meters after the same location, but the distance to object sensing system is indicating that its ability to detect objects has been reduced to shorter distances, then method 600 may request an automatic engine stop 20 meters after the location on the road the vehicle is traveling on changes from a positive grade to a negative grade so that the distance to object system may have the opportunity to potentially detect objects in the vehicle's path so that the predicted engine stop duration may be appropriately adjusted. However, if the vehicle's human driver has not released the accelerator pedal and the vehicle is expected at the location that is 20 meters after the location on the road the vehicle is traveling on changes from a positive grade to a negative grade, then method 600 does not request an automatic engine stop until the human driver releases the accelerator pedal and the vehicle begins to coast near the location on the road the vehicle is traveling on changes from a positive grade to a negative grade. Method 600 may automatically restart the engine after the engine has been automatically stopped when automatic engine restart conditions have been met (e.g., the engine may be restarted when driver demand torque is greater than a threshold torque). Method 600 proceeds to exit.

Referring now to FIG. 7, the method 700 may be part of method 600 (e.g., a sub-routine). At 702, method 700 transmits a light signal or an electromagnetic signal, or both a light signal and an electromagnetic signal from the vehicle in a direction in front of the vehicle and in the vehicle's direction of travel. The signal may be transmitted via a light source, a RADAR antenna, or other known transmission source. Method 700 proceeds to 704.

At 704, method 700 judges if present atmospheric conditions are altering a baseline object detection distance for the distance to object sensing system. Method 700 may judge that present atmospheric conditions (e.g., rain, temperature inversion, dust, insects) may be altering a baseline object detection distance for the distance to object sensing system when many signals are returned to the distance to object sensing system via reflections of energy from environmental conditions (e.g., rain, dust, insects, etc.). The signals that are returned, but not from an objected that is desired to be detected (e.g., a vehicle, a sign, an animate object, etc.), may indicate the presence of things that may not be desired to be detected and mask indications of objects that may be desirable to detect. The indication of things not desired to be detected may be referred to as "noise" or "clutter" in the data. Further, the "noise" or "clutter" may not allow other objects to be detected at greater distances, thereby reducing the capacity of the distance to object sensing system to detect objects at greater distances. In one example, method 700 may judge that atmospheric conditions are altering baseline detection distance for objects sensed via the distance to object sensing system when an amount of "noise" or "clutter" in the data exceeds a threshold amount. If method 700 judges that present atmospheric conditions are altering a baseline object detection distance for the distance to object sensing system, then the answer is yes and method 700 proceeds to 706. Otherwise, the answer is no and method 700 proceeds to exit.

At 706, method 700 optionally estimates the intensity of environmental conditions that may affect capacity of the distance to object sensing system to detect an object that is desired to be detected (e.g., sign, animate object, vehicle, etc.). In one example, method 700 estimates the intensity of the environmental conditions by an amount of "noise" or "clutter" in the signals that are received by the distance to object sensing system. For example, the intensity of the environmental conditions may increase as the actual total number of signals that return to the distance to object sensing system in a predetermined amount of time increases. Further, the intensity of the environmental conditions may be increased as a function of the strength of energy in the signals that are returned to the distance to object sensing system in the threshold amount of time. Method 700 proceeds to 708 after the intensity of atmospheric conditions are determined.

At 708, method 700 judges if the preset vehicle driver and/or drivers in the peer group modify their vehicle driving behavior during conditions where the distance to object sensing system capacity to sense an object is degraded.

Further, method 700 may determine how, if at all, the present driver's and peer driver's operation of the vehicle is modified at the present intensity level of the atmospheric conditions. For example, the present driver or peer drivers may tend to drive slower and release an accelerator pedal sooner during conditions when environmental conditions are affecting the capacity of the distance to object sensing system to detect an object at a predetermined distance. If method 700 judges that the present operator of the vehicle modifies their behavior when atmospheric conditions affect the capacity of the distance to object sensing system to detect an object at a predetermined distance, then the answer is yes and method 700 proceeds to 710. Otherwise, the answer is no and method 700 proceeds to 712.

At 710, method 700 increases or decreases the predicted vehicle coasting duration responsive to the distance to object sensing system capacity to detect an object being affected by environmental conditions. Method 700 may also delay or make later in time or increase a distance from a location of where vehicle coasting is predicted or expected to be so that the automatic stopping of the engine may be delayed due to capacity of the distance to object sensing system. Further, method 700 may make adjustments to the predicted amount of time the engine will be stopped, the predicted vehicle stop location, and predicted location where the engine will be stopped. For example, during conditions where the capacity of the distance to object sensing system to detect an object at a predetermined distance is reduced due to environmental conditions, the location where the vehicle is expected or predicted to begin coasting is advanced so that the engine may be stopped sooner. Further, the predicted vehicle coasting duration may be increased or decreased when environmental conditions affect (e.g., increase or decrease) the distance that an object may be detected by the distance to object sensing system.

By way of an example, during a clear day, a distance to object sensing system may have capacity to sense a sign at 500 meters. The controller may also predict during these conditions that the vehicle will begin coasting when the present vehicle is within 200 meters of the sign. However, during rainy conditions, the distance that the object sensing system may have capacity to sense the sign may be 400 meters. Accordingly, the controller may predict that during these conditions that the vehicle will begin coasting when the present vehicle is within 250 meters of the sign because of the driver's more cautious driving approach. On the other hand, some drivers may drive at nearly a same rate of speed when capacity of the distance to object sensing system is reduced; however, these drivers may also enter vehicle coast conditions later and apply vehicle brakes more heavily when they see the sign. Consequently, the controller may predict that during these conditions that the vehicle will begin coasting later (e.g., when the present vehicle is within 50 meters of the sign) because of the driver's more aggressive driving approach. Method 700 proceeds to 712 after adjustments to the predicted vehicle coasting duration, the predicted amount of time the engine will be stopped, the predicted vehicle stop location, and predicted location where the engine will be stopped have been made.

At 712, makes adjustments to the predicted vehicle coasting duration, the predicted start of vehicle coasting location, the predicted amount of time the engine will be stopped, the predicted vehicle stop location, and predicted location where the engine will be stopped responsive to the capacity of the distance to object sensing system to detect an object at a predetermined distance. In one example, the location where vehicle coasting is predicted is later when the capacity of the distance to object sensing system to sense an object at a predetermined distance is reduced, a location where the vehicle is predicted to begin coasting is made later in time and/or vehicle travel distance since the sign may be recognized by the controller at a closer distance as compared to if the distance to object sensing system where operating with a capacity to sense the sign at a further distance. Consequently, the controller may have to wait longer if it is using the sign as an indicator to automatically stop the engine and positive confirmation of the sign is desired before automatically stopping the engine. Likewise, the predicted vehicle coasting duration, the predicted amount of time the engine will be stopped, the predicted vehicle stop location, and predicted location where the engine will be stopped may be adjusted responsive to the capacity of the distance to object sensing system to detect an object at a predetermined distance. Once the locations or timings have been adjusted, method 700 proceeds to exit.

Thus, the method of FIGS. 6 and 7 provides for an engine operating method, comprising: adjusting an estimated vehicle coasting duration via a controller based on responses of a peer group of human drivers; and automatically stopping an internal combustion engine via the controller responsive to the estimated vehicle coasting duration. The method further comprises adjusting the estimated vehicle coasting duration responsive to severity of environmental conditions including at least one of ambient air density, humidity, rain, dust, hail, snow, and insects. The method further comprises adjusting the estimated vehicle coasting duration responsive to a capacity of a distance to object sensing system to detect an object at a predetermined distance.

In some examples, the method further comprises additionally adjusting the estimated vehicle coasting duration based on responses of a sub-peer group of human drivers. The method includes where the peer group of drivers includes a plurality of human drivers and further comprises consolidating the responses of the peer group of human drivers within a central server. The method further comprises additionally adjusting the estimated vehicle coasting duration based on responses of a sub-peer group of human drivers. The method further comprises adjusting a machine learning model responsive to a capacity of a distance to object sensing system to detect an object at a predetermined distance and adjusting the estimated vehicle coasting duration via the machine learning model.

The method of FIGS. 6 and 7 also provides for an engine operating method, comprising: assigning a machine learning model to a peer group of drivers; adjusting an estimated vehicle coasting duration based on responses of the peer group of human drivers; and automatically stopping an internal combustion engine responsive to the estimated vehicle coasting duration. The method further comprises overriding automatically stopping the internal combustion engine responsive to the estimated vehicle coasting duration. The method further comprises automatically stopping the internal combustion engine responsive to pedal input provided via a driver after overriding automatically stopping the internal combustion engine responsive to the estimated vehicle coasting duration. The method further comprises additionally adjusting the estimated vehicle coasting duration responsive to a change in capacity to detect an object via a distance to object sensing system due to environmental conditions. The method includes where the estimated vehicle coasting duration is decreased in response to a decrease in the capacity to detect the object. The method includes where the estimated vehicle coasting duration is increased in response to a decrease in the capacity to detect the object. The method includes where automatically stopping the internal combustion engine includes ceasing to rotate the internal combustion engine while a vehicle in which the internal combustion engine resides is coasting.

Referring now to FIG. 8, a prophetic example of two similar automatic engine stopping sequences for the system of FIGS. 1A-5 and the method of FIGS. 6 and 7 are shown. Vertical markers at distances d0-d7 represent locations of interest during the sequence. All of the plots occur at a same time and same vehicle operating conditions, unless otherwise mentioned. The first sequence begins at distance marker d0 and it ends at the I/marks that are near the middle of the plots. The second sequence begins at the distance marker d4 and it ends at the horizontal axis arrows. The vehicle of the sequence is at same location along a road at d0 and d4 to illustrate differences in the predicted vehicle coasting interval that may be generated when the capacity of the distance to object sensing system to sense an object at a predetermined distance is degraded or reduced.

The first plot from the top of FIG. 8 is a plot of a maximum object detection range (e.g., threshold distance that is not exceeded) for the distance to object sensing system. The vertical axis represents the maximum object detection range or distance for the distance to object sensing system and the maximum object detection range or distance increases in the direction of the vertical axis arrow. The horizontal axis represents distance traveled by the vehicle and the distance increases in the direction of the horizontal axis arrow. Trace 802 represents the maximum object detection range or distance of the distance to object sensing system.

The second plot from the top of FIG. 8 is a plot of a predicted vehicle coasting interval versus distance traveled by the vehicle. The vertical axis represents the predicted vehicle coasting interval (e.g., the distance the vehicle will coast when the human driver releases the accelerator pedal) and the predicted vehicle coasting interval increases in the direction of the vertical axis arrow. The horizontal axis represents distance traveled by the vehicle and the distance increases in the direction of the horizontal axis arrow. Trace 804 represents the predicted vehicle coasting interval or duration.

The third plot from the top of FIG. 8 is a plot of accelerator pedal position versus distance traveled by the vehicle. The vertical axis represents the accelerator pedal position and the accelerator pedal is applied further in the direction of the vertical axis arrow. The horizontal axis represents distance traveled by the vehicle and the distance increases in the direction of the horizontal axis arrow. Trace 806 represents the accelerator pedal position.

The fourth plot from the top of FIG. 8 is a plot of brake pedal position versus distance traveled by the vehicle. The vertical axis represents the brake pedal position and the brake pedal is applied further in the direction of the vertical axis arrow. The horizontal axis represents distance traveled by the vehicle and the distance increases in the direction of the horizontal axis arrow. Trace 808 represents the brake pedal position.

The fifth plot from the top of FIG. 8 is a plot of engine operating state versus distance traveled by the vehicle. The vertical axis represents the engine operating state and the engine is operating (e.g., rotating and combusting fuel) when trace 810 is at a higher level near the vertical axis arrow. The engine is not operating when trace 810 is near the horizontal axis. The horizontal axis represents distance traveled by the vehicle and the distance increases in the direction of the horizontal axis arrow. Trace 810 represents the engine operating state.

At distance d0, the vehicle is traveling with the engine being activated. The distance to object sensing system is able to detect objects at a long distance since environmental interference (e.g., rain, dust, snow, insects, etc.) is low. The predicted vehicle coasting interval is relatively long because objects may be sensed at a long distance via the distance to object sensing system. The accelerator pedal is applied by the human driver at a higher middle level and the brake pedal is not applied.

At distance d1, the human driver releases the accelerator pedal responsive to driving conditions. The engine remains activated and the distance to object sensing system is still able to detect objects at a long distance. The brake pedal is not applied and the predicted vehicle coasting interval or distance remains relatively long.

At distance d2, the engine is deactivated since it is determined that the predicted vehicle coasting duration is relatively long and driver demand torque remains low. The brake pedal is not applied and the predicted vehicle coasting distance or interval remains at its previous value. The maximum object detection range or distance of the distance to object sensing system remains relatively long.

Between distance d2 and distance d3, the vehicle coasts and the accelerator pedal and the brake pedal are not applied. The maximum object detection distance for the distance to object detection system remains unchanged and the predicted vehicle coasting distance remains unchanged. The engine remains deactivated.

At distance d3, the human driver applies the brake pedal so that the vehicle may be stopped. The engine remains stopped and the maximum object detection distance for the distance to object detection system remains unchanged. The accelerator pedal is not applied and the estimated vehicle coasting interval remains unchanged.

A break in time occurs after distance d3 and before distance d4. The break in time may be long or short and the vehicle travels back to the position d0 since the vehicle position at d0 and d4 is equivalent.

At distance d4, the vehicle is traveling with the engine being activated. The distance to object sensing system is able to detect objects at a shorter distance since environmental interference (e.g., rain, dust, snow, insects, etc.) is higher. The predicted vehicle coasting interval is shorter than at d0 because objects may be sensed at a shorter distance via the distance to object sensing system. The accelerator pedal is applied by the human driver at a higher middle level and the brake pedal is not applied.

At distance d5, the human driver releases the accelerator pedal responsive to driving conditions. The engine remains activated and the distance to object sensing system is still able to detect objects at a shorter distance. The brake pedal is not applied and the predicted vehicle coasting interval or distance remains shorter.

At distance d6, the engine is deactivated since it is determined that the predicted vehicle coasting duration is shorter, but long enough to save fuel. Also, notice that the duration between d5 and d6 is longer than the duration between d1 and d2 for the same vehicle. Since the distance traveled by the vehicle is longer between d5 and d6 than the distance between d2 and d3, the distance for coasting until the brake is applied is shorter in duration, yet long enough to provide some fuel consumption reduction. The estimated vehicle coasting distance may be reduced responsive to the reduction in the capacity of the distance to object sensing system to sense objects at a predetermined distance because objects in the vehicle's path may not be detected until the vehicle is closer to the object. Therefore, the system does not know if the engine will have to be restarted shortly after it has been stopped or if the vehicle may gradually coast to a stop at a further distance. The brake pedal is not applied and the predicted vehicle coasting distance or interval remains at its previous value. The maximum object detection range or distance of the distance to object sensing system remains relatively short.

Between distance d6 and distance d7, the vehicle coasts and the accelerator pedal and the brake pedal are not applied. The maximum object detection distance for the distance to object detection system remains unchanged and the predicted vehicle coasting distance remains unchanged. The engine remains deactivated.

At distance d7, the human driver applies the brake pedal so that the vehicle may be stopped. The engine remains stopped and the maximum object detection distance for the distance to object detection system remains unchanged. The accelerator pedal is not applied and the estimated vehicle coasting interval remains unchanged.

In this way, a predicted vehicle coasting interval may be adjusted responsive to a capacity of a distance to object sensing system to detect an object at a predetermined distance. If the distance to object sensing system has capacity to sense objects at a long distance, then the predicted vehicle coasting interval may be lengthened. Further, the engine may be requested to stop sooner for longer predicted vehicle coasting intervals, thereby increasing vehicle fuel economy.

Note that the example control and estimation routines included herein can be used with various engine and/or vehicle system configurations. Further, the methods described herein may be a combination of actions taken by a controller in the physical world and instructions within the controller. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
outputting, from a machine learning model, an estimated vehicle coasting duration via a controller based on responses of a peer group of human drivers;
adjusting the estimated vehicle coasting duration output from the machine learning model responsive to a change in a capacity of a distance to object sensing system to detect an object at a predetermined distance due to environmental conditions presently affecting the distance to object sensing system;
overriding automatically stopping an internal combustion engine via the controller responsive to the estimated vehicle coasting duration; and
automatically stopping the internal combustion engine via the controller responsive to the estimated vehicle coasting duration adjusted responsive to the change in the capacity of the distance to object sensing system.

2. The method of claim 1, wherein the environmental conditions presently affecting the distance to object sensing system include at least one of ambient air density, humidity, rain, dust, hail, snow, and insects.

3. The method of claim 1, where the peer group of drivers includes a plurality of human drivers and further comprising:
consolidating the responses of the peer group of human drivers within a central server.

4. The method of claim 1, further comprising additionally adjusting the estimated vehicle coasting duration based on responses of a sub-group of the peer group of human drivers.

5. The method of claim 4, further comprising adjusting the estimated vehicle coasting duration via the machine learning model responsive to a vehicle's human driver releasing an accelerator pedal after a location on a road the vehicle is traveling on changes from a positive grade to a negative grade with the engine determined to be automatically stopped a predetermined distance thereafter, but where the capacity has been reduced to shorter distance detection, the method further comprises automatically stopping the engine earlier than determined but still after the location on the road the vehicle is traveling on changes from the positive grade to the negative grade.

6. The method of claim 1, wherein adjusting the adjusting the estimated vehicle coasting duration includes adjusting a beginning time of an expected coast interval.

7. The method of claim 6, wherein adjusting the estimated vehicle coasting duration includes predicting an amount of time the internal combustion engine will be stopped.

8. An engine operating method of a vehicle, comprising:
assigning a machine learning model to a peer group of human drivers;

outputting, from the machine learning model, an estimated vehicle coasting duration based on actions of the peer group of human drivers;

adjusting the estimated vehicle coasting duration output by the machine learning model responsive to a change in a capacity to detect an object via a distance to object sensing system of the vehicle due to environmental conditions presently affecting the distance to object sensing system; and automatically stopping an internal combustion engine responsive to the adjusted estimated vehicle coasting duration.

9. The method of claim 8, further comprising overriding automatically stopping the internal combustion engine responsive to the estimated vehicle coasting duration, wherein adjusting the estimated vehicle coasting duration based on actions of the peer group of human drivers includes receiving output from the machine learning model that is based on the actions, wherein adjusting the estimated vehicle coasting duration responsive to the change in the capacity includes modifying the estimated vehicle coasting duration output of the machine learning model according to limitations of the distance to object sensing system.

10. The method of claim 9, further comprising automatically stopping the internal combustion engine responsive to pedal input provided via a driver after overriding automatically stopping the internal combustion engine responsive to the estimated vehicle coasting duration.

11. The method of claim 8, further comprising determining whether or not a vehicle driver in the peer group of human drivers modifies their vehicle driving behavior during conditions where the capacity to detect the object via the distance to object sensing system is degraded, and wherein the environmental conditions include at least one of ambient air density, humidity, rain, dust, hail, snow, and insects.

12. The method of claim 8, where additionally adjusting the estimated vehicle coasting duration includes decreasing the estimated vehicle coasting duration in response to a decrease in the capacity to detect the object.

13. The method of claim 8, where additionally adjusting the estimated vehicle coasting duration includes increasing the estimated vehicle coasting duration in response to a decrease in the capacity to detect the object.

14. The method of claim 8, where automatically stopping the internal combustion engine includes ceasing to rotate the internal combustion engine while the vehicle in which the internal combustion engine resides is coasting, where additionally adjusting the estimated vehicle coasting duration includes reducing the adjusted estimated vehicle coasting duration with shortened distance capacity to detect the object, and where the peer group of human drivers is in a specific geographical region.

15. The method of claim 8, where automatically stopping the internal combustion engine includes ceasing to rotate the internal combustion engine while the vehicle in which the internal combustion engine resides is coasting, where adjusting the estimated vehicle coasting duration includes advancing a location where the vehicle is expected or predicted to begin coasting so that the engine may be stopped sooner in response to conditions where the capacity of the distance to object sensing system to detect an object is determined to be reduced due to the environmental conditions.

16. The method of claim 8, where automatically stopping the internal combustion engine responsive to the adjusted estimated vehicle coasting duration includes:

in response to a vehicle's human driver releasing an accelerator pedal and the vehicle expected to begin coasting a first distance after a location on a road the vehicle is traveling on changes from a positive grade to a negative grade and the engine is expected to be stopped a second, greater, distance after the road changes from the positive grade to the negative grade, automatically stopping the engine at the first distance; and in response to the vehicle's human driver not releasing the accelerator pedal and the vehicle expected at the first distance after the road changes from the positive grade to the negative grade, not automatically stopping the engine until the human driver releases the accelerator pedal and the vehicle begins to coast.

17. The method of claim 8, where automatically stopping the internal combustion engine responsive to the additionally adjusted estimated vehicle coasting duration includes:

in response to a vehicle's human driver releasing an accelerator pedal and the vehicle expected to begin coasting a first distance after a location on a road the vehicle is traveling on changes from a positive grade to a negative grade and the engine is expected to be stopped a second, greater, distance after the road changes from the positive grade to the negative grade, but the capacity indicated from the distance to object sensing system is reduced due to environmental conditions, automatically stopping the engine a third distance, between the first distance and the second distance, after the road changes from the positive grade to the negative grade.

18. An engine control system, comprising:

an internal combustion engine;

a distance to object sensing system that transmits a signal and receives a reflected version of the signal; and a controller including executable instructions stored in non-transitory memory to:

output, via a machine learning model, an estimate of a vehicle coasting duration and stop the internal combustion engine based on the estimate of the vehicle coasting duration, the estimate of the vehicle coasting duration based on vehicle coasting durations of a predetermined peer group of human drivers, the machine learning model outputting the estimate of the vehicle coasting duration based on a function of responses of members of the predetermined peer group during conditions where performance of the distance to object sensing system is degraded due to environmental conditions; and additional instructions to adjust a beginning time or location for the estimate of the vehicle coasting duration output via the machine learning model responsive to a change in the distance to object sensing system's capacity to detect an object at a predetermined distance due to present environmental conditions.

19. The engine control system of claim 18, where the environmental conditions include at least one of ambient air density, humidity, rain, dust, hail, snow, and insects.

20. The engine control system of claim 18, where the predetermined peer group of human drivers in a specific geographical region.

* * * * *